United States Patent [19]
Findley et al.

[11] 3,977,692
[45] Aug. 31, 1976

[54] EXTENSIBLE SUPPORT STRUCTURE

[75] Inventors: Samuel A. Findley; Francis C. Rieger, both of Bronson, Mich.

[73] Assignee: The Scott & Fetzer Company, Bronson, Mich.

[22] Filed: Mar. 20, 1975

[21] Appl. No.: 560,395

[52] U.S. Cl. ............................ 280/87 HA; 74/493; 74/567; 248/298; 248/354 R
[51] Int. Cl.² ..................... A45C 13/02; B62D 1/18
[58] Field of Search .................... 280/87 HA, 87 C; 180/78; 248/298, 295, 354 R, 354 C; 74/493, 567

[56] References Cited
UNITED STATES PATENTS

| | | | |
|---|---|---|---|
| 3,170,711 | 2/1965 | Dunifon | 74/493 X |
| 3,491,614 | 1/1970 | Saunders | 74/493 |
| 3,533,302 | 10/1970 | Hansen | 280/87 HA |
| 3,678,778 | 7/1972 | Groves | 74/493 |
| 3,724,290 | 4/1973 | Burton | 74/493 |
| 3,803,939 | 4/1974 | Schenten | 74/493 |
| 3,877,670 | 4/1975 | Findley | 248/298 |

FOREIGN PATENTS OR APPLICATIONS

| | | | |
|---|---|---|---|
| 614,355 | 12/1960 | Italy | 74/493 |

*Primary Examiner*—M. H. Wood, Jr.
*Assistant Examiner*—John P. Silverstrim
*Attorney, Agent, or Firm*—Hill, Gross, Simpson, Van Santen, Steadman, Chiara & Simpson

[57] ABSTRACT

An extensible support structure comprising a housing formed of a pair of U-shaped members arranged to form an elongated passageway which telescopically receives a third member characterized by a cam member extending through aligned apertures in the first and second member and slots in the third member, overcenter means received in the housing and coacting with the cam member to urge it into a first position clamping the first and second members onto the third member to frictionally lock the third member in a selected axial position within the housing and a second position releasing the clamping engagement and the frictional lock of the third member.

19 Claims, 9 Drawing Figures

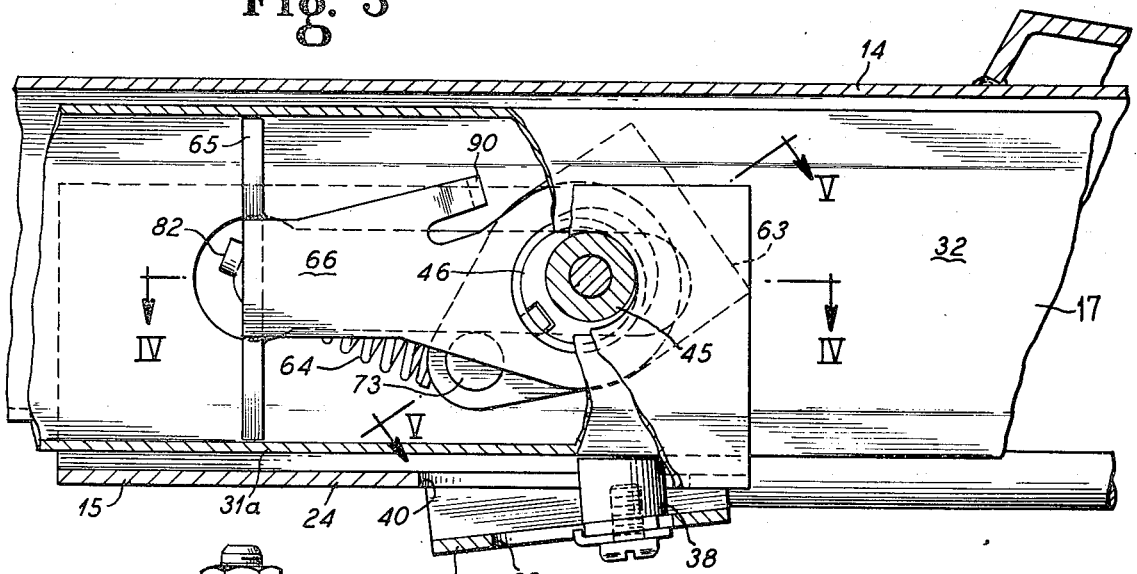
Fig. 3
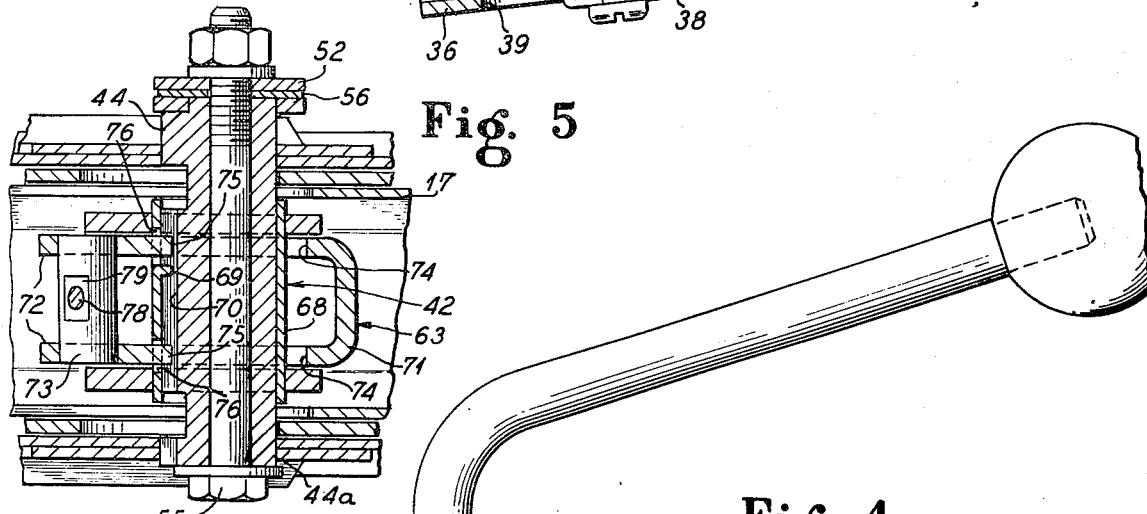
Fig. 5
Fig. 4
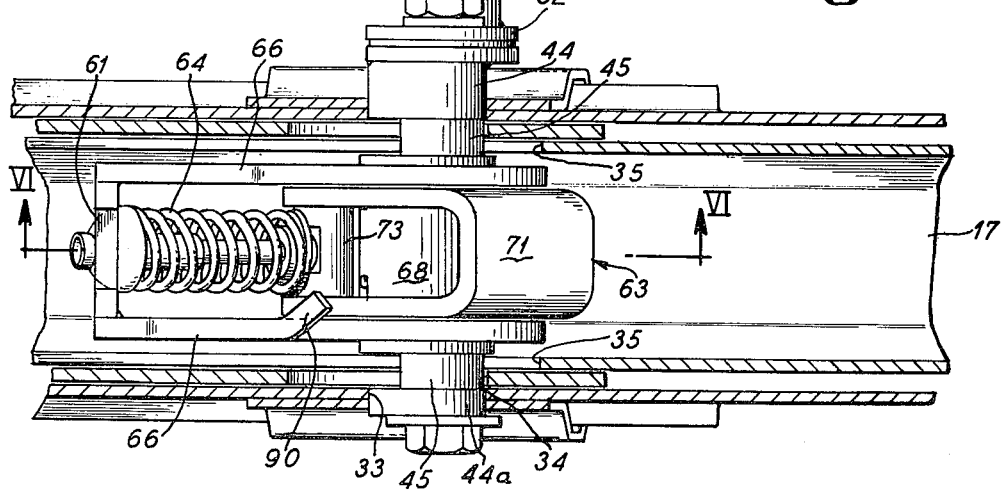

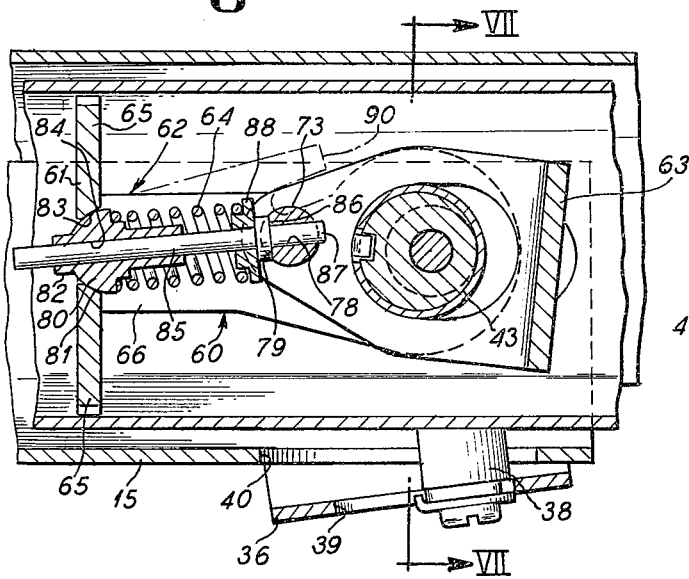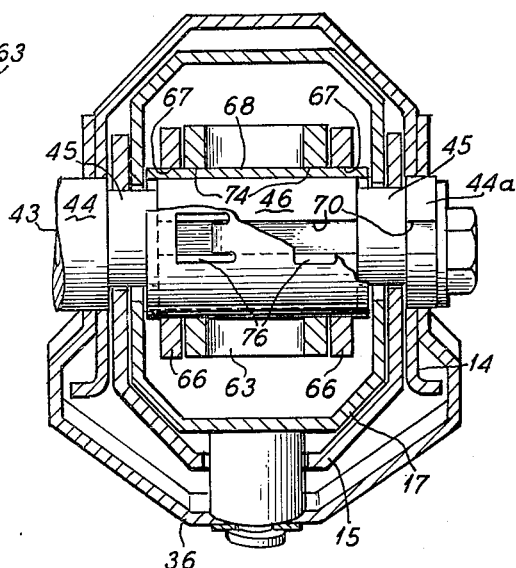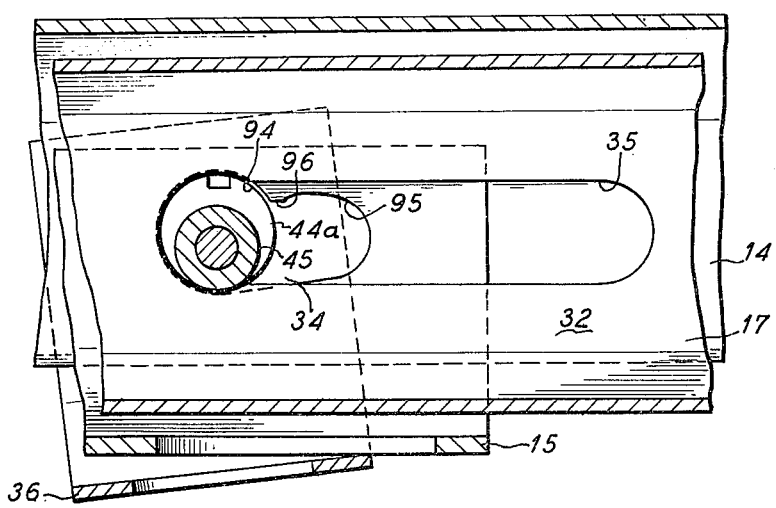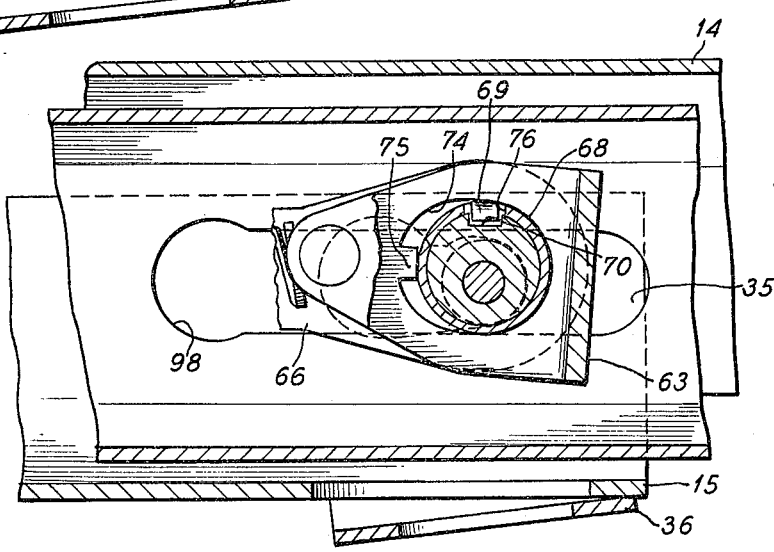

EXTENSIBLE SUPPORT STRUCTURE

CROSS REFERENCE TO RELATED APPLICATION

This application is a continuation-in-part of our U.S. Pat. Application Ser. No. 352,447 entitled "An Extensible Support Structure" filed Apr. 18, 1973, which issued as U.S. Pat. No. 3,877,670.

BACKGROUND OF THE INVENTION

1. Field of the Invention

The present invention is directed to an extensible support structure particularly adapted for supporting a steering column in adjustable positions with respect to a vehicle frame.

2. Prior Art

In recent years, various proposals have been suggested for providing adjustable steering columns. For example, tiltable steering columns have been suggested to facilitate the entry of the driver to the driving seat. Other suggested structures include steering wheels which can be axially adjusted to enable the desired position of the steering wheel for a particular driver.

In the commercial vehicles, it is often desirable that the steering wheel and steering column remain in substantially the same orientation while being adjusted to various positions relative to the dashboard or frame structure. One method proposed for obtaining an incremental adjustment of the position the steering wheel and column while maintaining the desired orientation thereof is disclosed in the U.S. Pat. No. 3,678,778, which issued to Donald W. Groves on July 25, 1972.

In providing a device for adjusting the position of a steering column and wheel assembly relative to the dashboard, it is desirable to have a device which allows an infinite variation in the distance of the assembly from the dashboard within a prescribed range. It is also desirable to provide an extensible structure which is held in the desired position by a frictional locking mechanism which will yield under a predetermined force such as occurring during a collision of the vehicle.

In our above-mentioned application, we proposed a support structure which would enable infinite variations in the position of a steering column and wheel assembly relative to a structural member without varying the orientation of the steering column. While this support structure satisfied many of the problems existing with the prior known devices, its structure pointed out additional features which were desired.

SUMMARY OF THE INVENTION

The present invention is directed to an extensible support structure for supporting a device such as a steering column and wheel assembly in adjustable positions relative to a structural member such as a frame member and which support structure enables infinite variations in the positions without varying the orientation of the device. The extensible support structure which accomplishes these tasks comprises an elongated housing having means for attaching the housing to a structural member, said housing having at least one inner surface defining an elongated passageway having a wall surface with at least one discontinuity extending the length of the passageway so that the cross section of the passageway can be contracted and expanded, a first elongated member telescopically received in the elongated passage and being free to assume an infinite number of axial positions in the elongated passageway with respect to the housing, said first member having one end extending from the passageway and adapted for attachment to the device, an actuating means movable between a first position for contracting the cross section of the passageway to force the wall surface into locking or clamping engagement on the first member and a second position for releasing the locking or clamping engagement of the first member, and overcenter means disposed in the elongated passageway for resisting movement of the actuating means from said first and second positions.

Preferably, the actuating means includes a cam member mounted for rotation in the housing, said member having at least a first surface eccentric to a second surface with the first and second surfaces engaging opposite sides of the discontinuities so that rotation of the cam member to said first position causes the clamping engagement and rotation to the second position causes the releasing of the clamping engagement. Preferably, the overcenter means includes a lever keyed to the cam member for rotation therewith, and the lever has a point moving in an arc as the lever is rotated between the first and second positions. The overcenter means also includes a support, means locating the support in a fixed position spaced from the cam member, and means extending between the support and the point for biasing against movement of the point to a center position on the arc between said first and second position so that as the point of the lever moves past the center position, the biasing means urges the lever and cam members into one of said first and second positions.

In a preferred structural embodiment, the housing is formed by a pair of elongated members each having a U-shaped cross section which members are arranged with the legs of one of the pair of members received in the legs of the other of the pair and the actuating means is a cam member extending through aligned apertures in the legs of said pair of members to form means for loosely interconnecting the members into a housing. The cam member has a first pair of spaced cam surfaces which engage the apertures of the first member and are eccentric to a second pair of spaced cam surfaces which are received in aligned apertures of the other member so that rotation of the cam member to the first position causes the cam surfaces to contract the passageway formed by the pair of members onto the third member and rotation of the cam member to the second position causes the passageway to release the clamping engagement.

BRIEF DESCRIPTION OF THE DRAWINGS

FIG. 3 is a cross-sectional view with portions broken away and in elevation for purposes of illustration taken along lines III—III of FIG. 2;

FIG. 4 is a cross-sectional view with portions in elevation for purposes of illustration taken along lines IV—IV of FIG. 3;

FIG. 5 is a partial cross-sectional view with portions in elevation for purposes of illustration taken along lines V—V of FIG. 3;

FIG. 6 is a cross-sectional view with portions in elevation for purposes of illustration taken along lines VI—VI of FIG. 4;

FIG. 7 is a cross-sectional view with portions in elevation and portions broken away for purposes of illustration taken along lines VII—VII of FIG. 6;

FIG. 8 is a cross-sectional view similar to FIG. 6 with portions removed for purposes of illustration to illustrate the position of the various parts during a step of assembly of the parts; and FIG. 9 is a view similar to FIG. 8 showing a subsequent step of the assembly of the parts.

DESCRIPTION OF THE PREFERRED EMBODIMENTS

Figure 1:
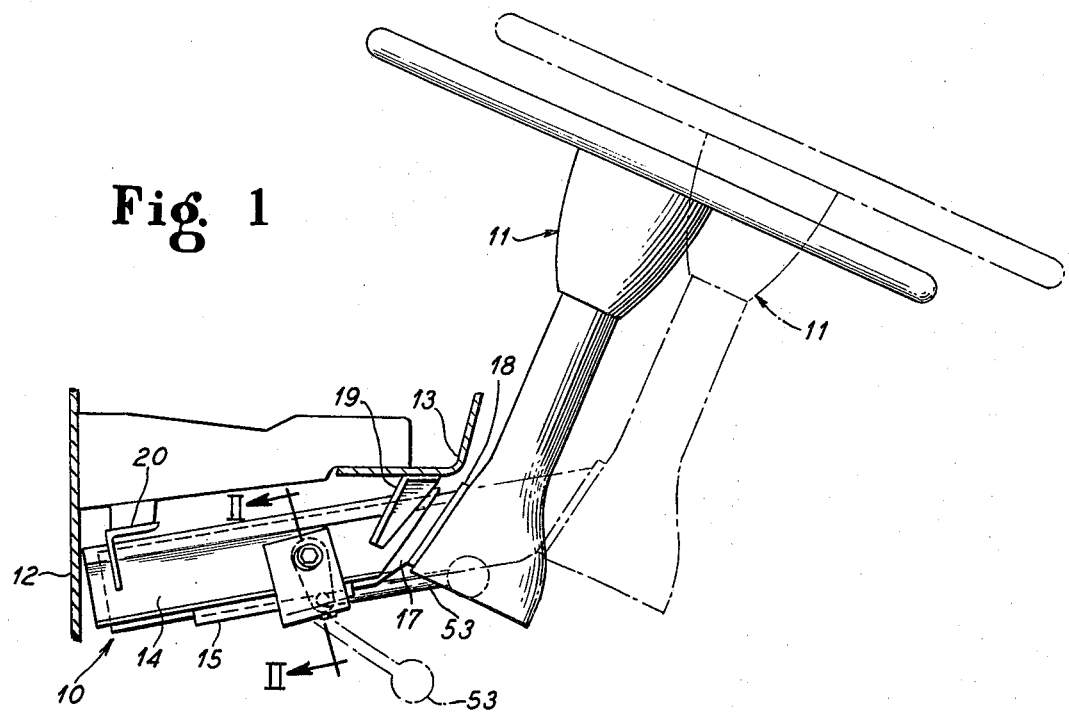
FIG. 1 is a side view of the extensible support structure of the present invention utilized for positioning a steering column and wheel assembly with respect to a dashboard of a vehicle.

The principles of the present invention are particularly useful in an extensible support structure generally indicated at 10 in FIG. 1 and illustrated as supporting a device such as steering column and wheel assembly generally illustrated at 11 in adjustable positions with respect to a structural member such as a forward wall 12 and a dashboard 13 of a motor vehicle. The assembly 11 is connected by conventional linkage, not illustrated, to the dirigible wheel or wheels of the vehicle.

The extensible support structure 10 includes a housing formed by a pair of elongated members 14 and 15 and a third member 17 telescopically received in the housing. One end of the member 17 extends out of the housing and is adapted for connection to the steering column and wheel assembly 11. As illustrated, the one end of member 17 is cut at an angle to its axis and is provided with a mounting bracket 18 to support the assembly 11 in the desired orientation. The housing is rigidly connected beneath the dashboard 13 by mounting means, such as bracket 19 and 20, which are attached to the first elongated member 14 of the pair. Thus, telescopic or axial movement of the member 17 in the housing shifts the assembly 11 relative to the dashboard 13 as illustrated in dash lines.

Figure 2:
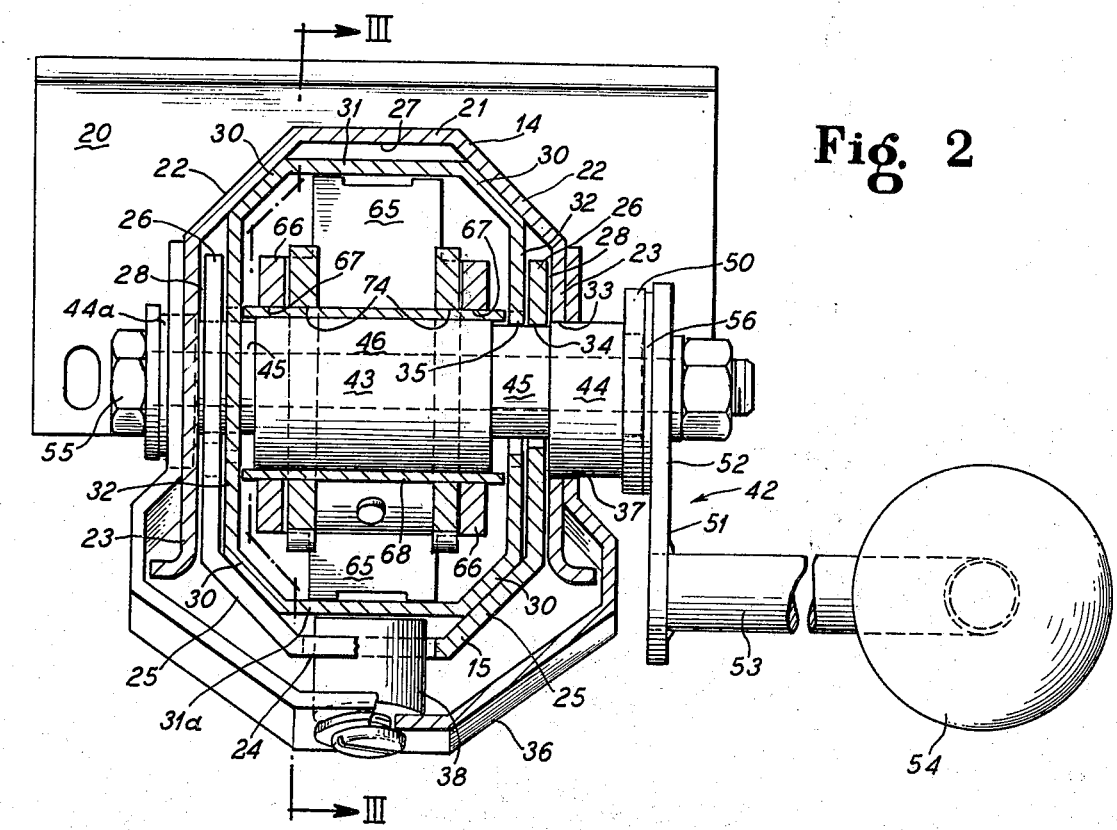
FIG. 2 is a cross-sectional view with portions in elevation and portions broken away for purposes of illustration of the extensible support structure of the present invention taken along lines II—II of FIG. 1.

As best illustrated in FIG. 2, the first elongated member 14, which is longer than the other or second member 15 of the pair, has a U-shaped cross section with a bight portion 21 connected on each side or edge by flat wall portions 22 to parallel extending legs 23. In a similar manner, the member 15 has a bight portion 24 connected on each edge by flat wall portions 25 to parallel extending legs 26. The two members 14 and 15 are arranged with the legs 26 of the second member 15 received between the legs 23 of the first member 14 to form an elongated passageway 27 having a wall surface with a discontinuity 28 adjacent each of the two lines or areas of overlap of the legs 23 and 26. The passageway 27 has a cross section which is contractable and expansible due to relative movement between the members 14 and 15.

The third member 17 is illustrated as having at least four flat surfaces 30 which are engaged by the flat portions 22,22 of the member 14 and the portions 25,25 of the member 15 respectively. As illustrated, the member 17 has eight sides with two horizontal sides 31 and 31a which are adjacent the bight portions 21 and 24, respectively, and a pair of vertically extending side walls 32,32 which are adjacent the legs 26.

Each of the legs 23 of the member 14 is provided with an aperture 33 and each of the legs 26 of the second member 15 is provided with an aperture 34, which as best illustrated in FIG. 8, has a keyhole configuration. Each of the side walls 32 of the third member 17 has an elongated slot 35. In addition to the above-mentioned slots and apertures, a guide bracket 36, which has a U-shape (FIG. 2) is attached to the first member 14 such as by spot welding to the legs 26, and the guide bracket 36 has a pair of apertures 37 which are aligned with the apertures 33 in the sides 23. The attachment of portions of the guide member or bracket 36 adjacent each of the apertures 33,33 provides reinforcement for the legs 23,23 and increases the bearing surfaces of apertures 33,33. In addition to the reinforcing of the side wall 23,23, the guide bracket 36 adjustably supports a retainer or guide 38 in a slot 39 (FIG. 3). The retainer 38 extends through an elongated slot 40 in the wall 24 of the second member 15 and engages the wall portion 31a of the inner tube 17. The purpose of the retainer 38 is to guide and stabilize the tube 17 as it is moved within the housing and to prevent noises caused by vibration on the device 10.

To move the first and second members 14 and 15 into clamping engagement with the member 17, an actuating means generally indicated at 42 is provided. The actuating means 42 includes a cam member 43 which has a first pair of spaced cam surfaces 44,44a which are rotatably received in the apertures 33,33 of the member 14 and are eccentric to a second pair of spaced cam surfaces 45,45 which are spaced apart by a surface 46 and are received in the apertures 34. The second pair of cam surfaces 45 are also received in slots 35. The surface 46 has the same size and configuration as the first pair of cam surfaces 44,44 and is axially aligned therewith.

To rotate the cam member 43, which provides means to loosely interconnect the members 14, 15 and 17, an end of the member 43 has a shoulder 50, such as a washer welded thereto and this end is detachably connected to an actuating lever 51. The lever 51, as illustrated, comprises a flat lever 52 and a curved rod-shaped handle or arm 53 terminating in a knob 54 which lever 52 and arm are joined together by a welded joint. To detachably connect the actuating lever 51 to the cam member 43, a threaded fastener, such as a bolt 55, extends through a bore in the cam member 43 and clamps a portion of the flat lever 52 onto the shoulder 50 with a lock washer such as 56 interposed therebetween.

Movement of the arm or lever 53 from the position illustrated in bold lines in FIG. 1 to the position illustrated in broken lines rotates the cam member 43 between a first position and a second position. The cam member 43 will rotate on the axis of the first cam surface 44,44a which are received for rotation in the apertures 33,33 and the second pair of cam surfaces 45,45 move in an eccentric path. Thus movement of the cam member 43 to the first position (FIG. 3) causes the second member 15 to be forced toward the portion 21 of the first member 14 to contract the cross section of the passageway of the housing into clamping engagement with the third member or hollow tube 17 to frictionally lock the member in the housing. Rotation of the cam member 43 from the first position to the second position (FIG. 6) causs movement of the second pair of cam surfaces 45 relative to the first pair to apply a force to the second member to move it away from the portion 21 of the first member and expand the passageway and release the locking engagement. While the cam member 43 is in the second position, the third member 17 is fred to be shifted axially in the passageway with the range of axial position being limited by the length of slots 35,35. Due to the size of the keyhole apertures 34,34, the second pair of surfaces 45,45 are loosely received in the apertures 34,34 and have a lost motion connection with the second member 15. To maintain the cam member 43 of the actuating means 42 in either the first or second position an overcenter device generally illustrated at 60 is provided within the housing and within member 17. The overcenter device 60 (FIG. 6) includes a support 61, means 62 for locating or holding the support 61 in a spaced relationship to the cam member 43, a lever 63 keyed to the cam member 43 and biasing means such as spring 54 for urging the lever 63 and cam member 43 toward either the first or second positions.

The means 62 for locating a pair of extensions 65,65 which are a part of the support 61 and which extensions slidably engage the inner surface of the tube or member 17 and a pair of arms 66,66. Each of the arms 66 has an aperture 67 which receives a cylindrical member or tube 68 for rotation. The tube or member 68 is telescopically received on the surface 46 of the cam member 43 and keyed to the member 43 by a tab 69 received in a groove 70 formed in the surfaces 44a and 46. Thus, the tube 48 will rotate with the member 43 and in the apertures 67,67 of the pair of arms 66,66 which are limited or prevented from rotating by extension 65,65.

The lever 63 includes a U-shaped member 71 (FIG. 5) which has a pair of arms 72,72 that are spaced apart at one end by an extension 73 which is a pin rotatably supported on the arms. Each of the arms 72,72 has an oblong aperture 74 with a tab or projection 75 at one end. The lever 63 is mounted on the tube 68 between the arms 66,66 with the tabs 75 extending through apertures 76,76 of the tube 68 and into groove 70 to key the lever 63 to the cam member 43. The pin 73, which is mounted with its axis extending substantially parallel to the axis of the cam member 43 and transverse to the plane of rotation of each arm 72, is provided with a radial passage 78 that intersects a cordial or flat surface 79.

The spring 64 (FIG. 6) of the biasing means has one end telescopically received on an end member 80 which has a substantial hemispherical surface 81 with an axial extension 82. The support 61 is provided with an aperture 83 which receives the extension 82 and is recessed on a side face of the cam member 43 to engage the surface 81 to form a socket for pivoting movement therebetween. The member 80 has an axial passage 84 to slidably receive a shaft or pin 85 which has a shoulder 86 spaced from the other end 87. The shaft 85 extends axially through the spring 64 whose other end urges a spring retainer 88 against the shoulder and holds the shoulder 86 against the surface 79 with the end 87 in the passage 78 of pin 73. The shaft 85, member 80 and retainer 88 form a spring guide for the biasing means.

As the lever 63 moves with the cam member 43 from a first position (FIG. 3) to the second position (FIG. 6), the pin 73 moves in an arcuate path or arc which has a closest or nearest point of approach to the support 61 occurring between the first and second positions. The position of the lever 63 at the pin 73 closest point of approach is referred to as the center position. In the illustrated embodiment, the amount of travel from the first position to the center position is more than the amount of travel from the center position to the second position which position is limited by a stop 90 provided on one of the arms 66 of the locating means. During movement from the first position to the second position, the compression spring 64 resists or opposes the movement until the lever 63 reaches the center position, and as the lever moves past the center position, the spring urges the lever to the second position. The action of the overcenter means 60 during movement from the second position to the first position is the same with an initial opposition to the movement until the center position is passed at which time the spring urges the lever toward the first position. In other words the overcenter means 60 resists movement of the lever 63 from either the first or second positions until the center position is passed at which time the spring forces urge the lever 63 to the other position and the overcenter means 60 acts to hold the cam member in one of the first or second positions until a force on arm 53 overcomes the force of spring 64.

As mentioned hereinabove, the apertures 34 have a keyhole configuration with a large portion 94 and a small portion 95 which are interconnected by throat portion 96. Also, the slots 35 are provided with enlarged portion 98 which enables passing the large cam surfaces such as 44 therethrough.

To assemble the device 10, the overcenter means 60 is assembled with the tube 68 (FIG. 9) received in the apertures 74 of lever 63 and aperture 67 of arms 66, but it is rotated approximately 90° from the operating position so that the tabs 75 are not received in the apertures 76 of the tube 68. Thus, the spring 64 urges the lever 63 in tight engagement with the tube 75 and against the stop 90. With the overcenter device 60 in this position, it is inserted within the inner tube 17 with the mounting tube 68 aligned with the enlarged portion 98 of the slots 35. In addition thereto, members 14 and 15 are assembled on the inner tube or third member 17 with the enlarged portion 94 of the keyhole slots 34 and the aperture 33 in alignment with the enlarged portion 98 (FIG. 8). The cam member 43 is then inserted with the groove 70 in alignment with the tab 69 until the portion forming one of the cam surfaces 44a is received in the opposite aperture 33. When in this position, the second pair of cam surfaces 45 are aligned within the keyhole apertures 34 of the second member 15 which is then shifted so that the cam surfaces 45 pass through the throat 96 into the small area 95. After shifting the member 15 to this position, the cam member 43 is rotated approximately 90° in a counterclockwise direction or until the projections 75 on the arms 72 are aligned with the apertures 76 and the groove 70. As the projections 75 are aligned with the aperture 76 and groove 70, the spring 64 urges the lever 63 away from the support 61 to insert the tabs 75 into the groove 70 to key the lever 63 to the cam member 43.

It should be pointed out that after the above assembly with the second cam portions 45 in the narrow portions 95 of the apertures 34, the projection forming the throat 96 prevents axial shifting of the member 15 to a position which would allow withdrawl of the cam member. Thus, to disassemble the device 10 requires withdrawing the tabs 75 from the groove 70, shifting the lever 64 relative to the tube 68, and then rotating the cam member 43 and tube 68 relative to the lever 63 to a position illustrated in FIG. 9. While in this position, the members 14, 15 and 17 can be shifted to align both the large portions 94 of aperture 34 and the large portion 98 of slots 35 with the aperture 33 to enable removal of the cam member 43.

As can be readily seen from the drawings, the overcenter means 60 maintains the selected clamping or release position of the actuating means and is disposed completely within the housing. Therefore, the only exposed portion of the overcenter means and the locking means is the actuating lever 51 which extends from the housing formed by the first and second members 14 and 15. Such an arrangement provides added advantages in that there are relatively few moving parts, or projections, which are exposed to catch clothing of the operator or to provide safety hazards.

Although various minor modifications might be suggested by those versed in the art, it should be understood that we wish to employ within the scope of the patent granted hereon, all such modifications as reasonably and properly come within the scope of our contribution to the art.

We claim:

1. An extensible support structure for supporting a device in adjustable positions relative to a structural member, said support structure comprising an elongated housing and means for attaching the housing to the structural member, said housing having at least one inner surface defining an elongated passageway having a wall surface with at least one discontinuity extending the length of the passageway so that the cross section of the passageway can be contracted and expanded, a first elongated member telescopically received in the elongated passageway and being free to assume an infinite number of axial positions in the elongated passageway with respect to the housing, said first member having one end extending from the passageway and adapted for attachment to the device, actuating means movable between a first position for contracting the cross section of the passageway to force the wall surface forming the passageway into clamping engagement on the first member and a second position for releasing the clamping engagement of the first member, and overcenter means disposed in the elongated passageway for biasing the actuating means into either said first or second position.

2. An extensible support structure according to claim 1, wherein said actuating means when moving to said second position applies a positive force for expanding the cross section of the passageway to release the clamping engagement of the first member.

3. An extensible support structure according to claim 1, wherein said actuating means includes a cam member mounted for rotation in said housing, said member having a first surface eccentric to a second surface, said first and second surfaces engaging opposite sides of the discontinuity so that rotation of the cam member to said first position causes said clamping engagement and rotation to the second position causes the releasing of the clamping engagement.

4. An extensible support structure according to claim 3, wherein the overcenter means includes a lever keyed to the cam member for rotation therewith, said lever having a point moving in an arc as the lever rotates between the first and second positions, a support, means locating the support in a fixed position spaced from the cam member, means extending between the support and the point for biasing against movement of the point to a center position on the arc between the first and second positions, so that as the point of the lever moves from the center position, the means for biasing urges the lever and the cam member into one of said first and second positions.

5. An extensible support structure according to claim 4, wherein the point is a projection extending from the lever transverse to the plane of rotation of the lever.

6. An extensible support structure according to claim 4, wherein the means locating the support locates the support radially outward of the arc of the point so that the center position of the point is a position of the arc nearest the support and wherein the biasing means is a compression spring for urging the point away from said center position and away from the support.

7. An extensible support structure according to claim 6, wherein the support has a recess on a surface facing the lever arm, and wherein the biasing means includes an end member engaged on an end of the spring and received in the recess to enable pivoting movement between the support and end member.

8. An extensible support structure according to claim 7, wherein the point comprises a pin mounted for rotation on the lever with the axis of the pin extending substantially parallel to the axis of the cam member, and wherein the biasing means includes a spring guide comprising a shaft telescopically receiving the spring, said shaft extending radially from said pin and being slidably received in the end member.

9. An extensible support structure according to claim 1, wherein the housing is formed by a pair of elongated members, and wherein the actuating means loosely interconnects said pair of members to form the passageway with a pair of longitudinally extending discontinuities in the wall of the passageway, and wherein said actuating means when moved to the first position forces the pair of members of the housing into clamping engagement on the first member.

10. An extensible support structure according to claim 9, wherein each of the pair of members forming the housing has a substantially U-shaped configuration with the legs of one of the pair of members disposed within the legs of the other of said pair and wherein the actuating means includes a cam member mounted for rotation in said housing, said cam member having a first pair of cam surfaces eccentric to a second pair of cam surfaces, said first and second surfaces engaging opposite sides of the pair of discontinuities so that rotation of the cam member to said first position causes said clamping engagement and rotation of the cam member to the second position causes the releasing of the clamping engagement.

11. An extensible support structure according to claim 10, wherein the overcenter means includes a lever having a pair of arms axially spaced apart at one end by a pin member, the other ends of the pair of arms being keyed to the cam member for rotation therewith, a support, means locating the support in a fixed position spaced from the cam member, means extending between the support and the pin of the lever for biasing against the movement of the lever to a center position between the first and second positions so that as the pin of the lever moves out of the center position, the means for biasing urges the lever and cam member into one of said first and second positions.

12. An extensible support structure according to claim 11, wherein the means for biasing is a compression spring and includes a spring guide comprising a shaft extending radially from the pin and slidably received in an end member engaged on the opposite end of the spring, said end member being received in a recess formed on a surface of the support facing the arms of the lever to enable pivoting between the end member and the support.

13. An extensible support structure for supporting a steering column in adjustable positions relative to a structural member of a motor vehicle, said support structure comprising first and second elongated members, means for loosely interconnecting said first and second members to form an elongated housing having an elongated passageway, one of said first and second members having means adapted for attaching the housing to the structural member, a third elongated member telescopically received in the elongated passageway and being free to assume an infinite number of axial positions in the elongated passageway with respect to the housing, said third member having one end extending from the passageway adapted for attachment to the steering column, actuating means movable between a first position for contracting the cross section of the passageway to force the first and second member into clamping engagement on the third member to frictionally lock said third member in one of the axial positions and a second position for releasing the clamping engagement on the third member, and overcenter means disposed in the elongated passageway for biasing the actuating means into either said first or second position.

14. An extensible support structure according to claim 13, wherein the first and second members each have a U-shaped configuration with the legs of the second member received within the legs of the first member to form a passageway having a cross section which is both contractable and expansible, said means for interconnecting and said actuating means including a cam member extending through aligned apertures in the legs of said first and second members, said cam member having a first pair of spaced cam surfaces engaging the apertures of the legs of the first member and eccentric to a second pair of spaced cam surfaces engaging the apertures of the legs of the second member, and wherein said actuating means includes a lever attached to the cam member for rotating the cam member between the first position with the cam surfaces contracting the passageway formed by the first and second members onto the third member and a second position with the first and second members released from a clamping engagement on the third member.

15. An extensible support structure according to claim 14, wherein the third member is a tubular member having a pair of elongated slots receiving portions of the cam member, said slots defining tHe range of infinite axial positions of the third member within the passageway formed by the first and second members, and wherein the overcenter means is disposed within the hollow tubular third member.

16. An extensible support structure according to claim 15, wherein the overcenter means includes a support, means locating the support in a fixed position within the third member spaced from the cam member, a lever keyed to the cam member for rotation therewith, said lever having an extension extending transverse to a plane of rotation of the lever, means extending between the support and the extension for biasing against the movement of the lever to a center position between a first and second position so that as the extension of the lever moves out of the center position, the means for biasing urges the lever and the cam into one of said first and second positions.

17. An extensible support structure according to claim 16, wherein the means for locating the support includes a pair of arms loosely received on the cam member, and the support having extensions slidably engaging an internal surface of the third member.

18. An extensible support structure according to claim 16, wherein the extension comprises a pin rotatably supported on a pair of spaced lever arms loosely received on the cam member, each of said lever arms having a tab engageable in a groove in the cam member to key the lever thereto and wherein the means for biasing is a compression spring holding the arms with the tabs disposed in the groove of the cam members to key them thereto.

19. An extensible support structure according to claim 18, wherein the biasing means includes a spring guide having a shaft extending from said pin and telescopically received within the spring, said shaft slidably received in an end member disposed on the opposite end of the spring and received in a recess of the support to enable pivoting between the support and end member.

* * * * *